United States Patent [19]

Leiber

[11] Patent Number: 4,593,955

[45] Date of Patent: Jun. 10, 1986

[54] YAW-COMPENSATED VEHICLE ANTI-SKID SYSTEM

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 617,373

[22] Filed: Jun. 4, 1984

[30] Foreign Application Priority Data

Jun. 14, 1983 [DE] Fed. Rep. of Germany ....... 3321370

[51] Int. Cl.$^4$ .......................... B60T 8/64; B60T 8/70
[52] U.S. Cl. ...................... 303/106; 303/111
[58] Field of Search ...................... 303/96, 97, 92, 105, 303/106, 107, 108, 110, 111, 119; 364/426

[56] References Cited

U.S. PATENT DOCUMENTS

| | | | |
|---|---|---|---|
| 3,797,892 | 3/1974 | Leiber | 303/106 |
| 3,966,264 | 6/1976 | Mattori et al. | 303/109 |
| 4,005,910 | 2/1977 | Leiber et al. | 303/96 |
| 4,033,635 | 7/1977 | Montoya | 303/109 |
| 4,254,998 | 3/1981 | Marshall et al. | 303/92 |
| 4,288,127 | 1/1981 | Leiber et al. | 364/426 |
| 4,309,060 | 1/1982 | Leiber et al. | 303/106 |
| 4,489,382 | 12/1984 | Jonner et al. | 303/96 |

Primary Examiner—Bruce H. Stoner, Jr.
Assistant Examiner—Alvin Oberley
Attorney, Agent, or Firm—Frishauf, Holtz, Goodman & Woodward

[57] ABSTRACT

To prevent erroneous operation of a wheel anti-skid or anti-brake lock system which is arranged to compensate for yaw of the vehicle if the wheels at the respective sides of the vehicle operate on portions of a road surface of widely different roughness, e.g. one side of the vehicle on a dry road track and the other side on ice or snow, upon movement of the vehicle through a curve during which a brake is applied, so that the yaw-prevention portion of the system might erroneously recognize movement through the curve as yaw, that is, rotation about a vertical axis through the vehicle, an accelerometer (36') is provided, connected to sense transverse acceleration of the vehicle, e.g. about a vertical axis, and inhibiting application of the yaw-preventing signals to the automatic braking system. Application of the yaw-preventing signals is inhibited by including an AND-gate (36, 35) in the yaw-preventing circuits (31, 30) so that, unless the AND-gate is enabled, signals from the yaw-prevention circuit will not be transmitted.

7 Claims, 5 Drawing Figures

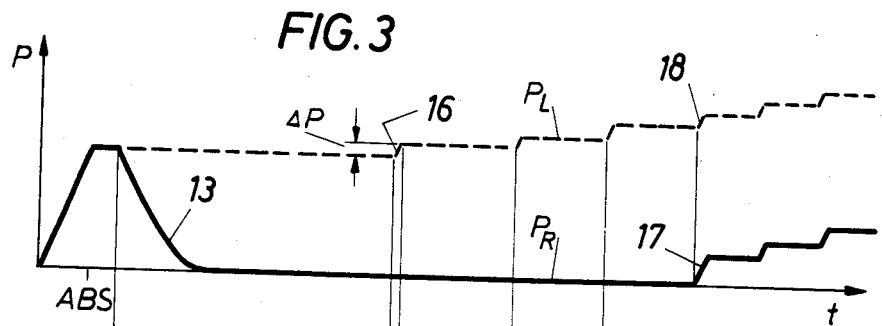
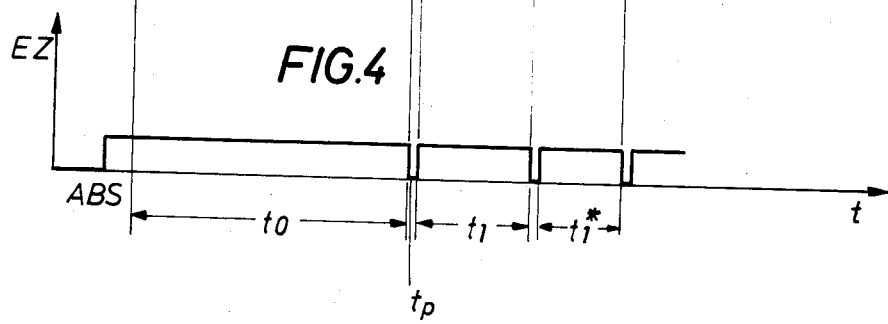
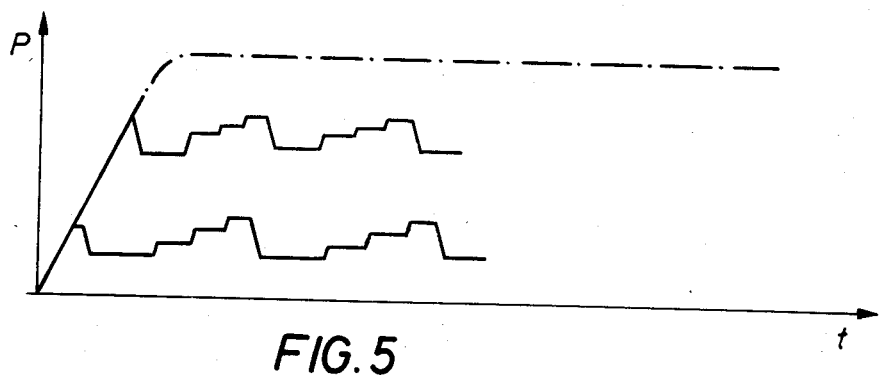

YAW-COMPENSATED VEHICLE ANTI-SKID SYSTEM

Reference to related patent and application, assigned to the assignee of the present invention, the disclosures of which are hereby incorporated by reference:

U.S. Pat. No. 4,288,127, Sept. 8, 1981, LEIBER & JONNER;

U.S. Ser. No. 469,714, filed Feb. 26, 1983, JONNER, KORASIAK & LEIBER, now U.S. Pat. No. 4,489,382.

The present invention relates to vehicle anti-skid or anti-brake blocking systems, and more particularly to such a system which is described in the referenced U.S. Pat. No. 4,288,127, LEIBER and JONNER, and U.S. application Ser. No. 469,714, JONNER, KORASIAK & LEIBER, now U.S. Pat. No. 4,489,382.

BACKGROUND

Anti-skid brake control systems are known in which signals are derived from wheel speed transducers which are representative of deceleration of the vehicle, acceleration of the vehicle, or the wheels, respectively, and which then can determine slippage between the wheels and a road surface. Depending on limiting or predetermined values of such control signals, the brakes of the respective wheels are so controlled that, if blocking of a wheel, or tendency to block is sensed, the wheels are braked only to that limit which is just above the skidding or blocking condition.

The situation may arise that vehicles operate on road surfaces which have highly asymmetrical frictional characteristics. For example, the wheels on one side of the vehicle may be on a dry or rough surface, whereas the wheels of the vehicle on the other side thereof may be on a highly slippery surface, such as on a sheet of ice, snow cover, or wet surface. Upon application of brakes, which will be effective on the side of the vehicle which has the gripping road surface, substantial yawing torques may arise; such yawing torques extend about a vertical axis through the vehicle. Due to braking, the wheels which are on the rough or gripping side of the road will be highly decelerated, thus decelerating the vehicle; the wheels which are on the slippery side of the road will not decelerate much, and thus rotary or yawing torques will have a tendency to turn the vehicle about its vertical axis. This condition arises particularly in trucks, cross-country transport vehicles, and the like.

It has previously been proposed to counteract the high yawing torques by controlling the brakes on the side of the vehicle which has the high frictional engagement with the road in dependence on braking at the side having the low frictional values. It has been proposed to leave the braking pressure on the vehicle side with the high frictional value and not drop it, upon sensing of slippage at the low friction side; the braking pressure is not increased, however, either until the braking pressure applied to the side with the low frictional value is also increased. In this type of operation, pressure at the high-friction side, capable of providing high braking effort and having a high braking effect, is increased only in a specific relationship with respect to the braking effort or braking effect obtainable at the vehicle side operating on a slippery surface.

A vehicle brake anti-block control system of this type is described, for example, in the referenced U.S. Pat. No. 4,288,127, assigned to the assignee of the present application.

The situation may arise under extreme conditions of vehicle operation that the braking distance becomes too long, particularly if the difference in braking effect which can be obtained at the two vehicle sides is high or extreme; this braking effect can also be simulated as far as the wheel speed transducers are concerned by differential friction within the wheel bearings, or by poorly releasing brakes at specific wheels. The overall braking distance, thus, may become excessive since the interaction of build-up of braking pressure at the vehicle side which operates on a high-friction surface is delayed to long. To improve the situation, and match more conditions, thus, the braking pressure $P_L$ of the wheel operating at a higher frictional level is increased by a special control signal $E_Z$ if a predetermined minimum time $t_o$ is exceeded between dropping of braking pressure and subsequent increase of braking pressure at the wheel operating at the slippery surface. The referenced U.S. application Ser. No. 469,741, JONNER, KORASIAK & LEIBER, filed Feb. 26, 1983, now U.S. Pat. No. 4,489,382 describes such an arrangement. This arrangement has the advantage that an optimum compromise between low yawing torques and short braking distance can be obtained. The supervision of the braking pressure is particularly simple since increase of braking pressure at the vehicle side operating at the high-friction surface can be easily controlled by merely monitoring the temporal occurrence of the control signals for the braking pressure inlet and outlet valves of the brakes of the vehicle operating at the slippery side of the roadway.

The braking pressure control, as described, can be matched to various types of operating situations by, for example, relating the application of braking pressure to the brakes at the side with the high-friction surface to vehicle speed.

Limiting yawing torques is particularly important in vehicles with large rolling radii, since the yawing torques should be primarily effective upon braking by asymmetrical frictional conditions between wheel and road surface. Limitation of yawing torques is also necessary for vehicles which should be braked with good vehicle operating control at high speed if the gripping conditions between tires and road surface are different between right and left side of the vehicle.

Differential braking forces occur not only when the wheels of the vehicle operate on road surface portions which have different slipperiness or frictional characteristics at the different sides of the vehicle. They also occur upon braking when the vehicle passes through a curve, or, otherwise, when there is high acceleration transverse to the longitudinal axis of the vehicle. It would be disadvantageous to prevent application of optimum braking effort or braking effects to the wheels of the vehicle by yawing torque limitation, if braking is to be carried out for example in a curve. For deceleration, at least the front wheels of the vehicle passing through a curve should be fully effective, so that the vehicle will be decelerated from excessive speed, or from a limiting speed range.

THE INVENTION

It is an object to modify an automatic braking control system so that braking effort will become fully effective if the vehicle operates in a curved path or the like; and to provide such a system which is generally applicable, although it is particularly suitable for a system as described in the referenced application Ser. No. 469,741, filed Feb. 26, 1983, JONNER, KORASIAK & LEIBER, now U.S. Pat. No. 4,489,382.

Briefly, an accelerometer senses centrifugal acceleration of the vehicle, for example due to the vehicle passing through a curve; a control system then is provided which modifies braking control signals applied to left and right brakes, respectively, to modify the command of increased braking pressure as a function of transverse or centrifugal vehicle acceleration, for example by inhibiting limitation of braking pressure being applied as a result of an automatic braking system in which differential wheel speed, and differential wheel operation, such as deceleration and acceleration, might otherwise simulate the presence of a yawing torque.

Utilizing an accelerator sensor which is so arranged or placed in the vehicle that it senses transverse accelerations, or example the type of acceleration which results in a yawing torque, permits distinguishing braking in a curve from braking on a road surface having asymmetrical frictional characteristics. Consequently, the stability of operation of the vehicle upon application of brakes on the curve is obtained while the limitation of yawing torques due to asymmetrical road surface conditions can likewise be obtained. It has previously been proposed to sense operation of a vehicle in a curve, and the use of acceleration sensors for curve recognition, as such, is known. According to the U.S. Pat. No. 3,797,892 a transverse acceleration signal is used to change the operating mode of a braking control system from a select-high mode of operation to a select-low mode of operation.

DRAWINGS

FIGS. 3 and 4 are graphs illustrating the braking pressures, and braking pulses upon operation of the system of FIG. 2; and FIG. 5 illustrates a pressure-vs.-time curve, similar to FIG. 1, upon recognition that the vehicle operates in a curved path.

DETAILED DESCRIPTION

Figure 1:
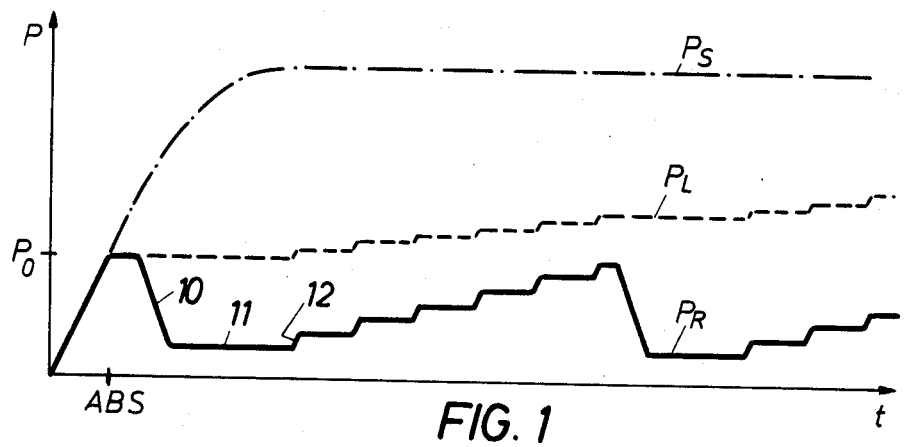
FIG. 1 illustrates the pressure relatinships in an automatic braking system, or anti-wheel block system with yaw-torque compensation, as described and in accordance with the disclosure of the referenced application Ser. No. 469,741.

FIG. 1 illustrates the braking pressure P, at the ordinate of the curve, with respect to the time t, upon initiation of a braking event. The chain-dotted curve $P_S$ shows the braking pressure command applied by a brake pedal; the broken-line curve $P_L$ illustrates the braking pressure applied to a wheel or the wheels on the left side of the vehicle operating, for example, on a rough or high-friction portion of the road surface; and the full-line curve shows the braking pressure $P_R$ applied to the right side of a wheel or the wheels of the vehicle.

At an instant of time, in which the anti-wheel or brake locking system ABS becomes effective, the control pressure $P_S$ commanded, for example, by depression of a brake pedal by the operator, no longer will be applied to the brakes; the ABS system, rather, will first maintain the braking pressure at both wheels at a constant value $P_O$. In the subsequent description, it will be assumed that the right side of the vehicle is on a slippery surface, for example on a portion of a roadway covered with snow, ice, and the like, whereas the left side of the vehicle is on a rough uncovered or clear surface of roadway.

The braking pressure $P_R$, thus, is dropped at the curve portion 10 in order to prevent blocking of the right wheel and skidding of the wheel at the right side of the vehicle. Curve portion 11 illustrates a constant braking pressure phase; curve portion 12 shows stepped, slow increase in braking pressure.

Systems have been proposed in the prior art to prevent the occurrence of high yawing torques which hold the braking pressure at the left wheel, $P_L$, first at a constant value, and then increase the braking pressure at the left wheel similarly to the stepped increase corresponding to the curve portion 12 at the right wheel. Preferably, the stepped increases in braking pressure are smaller than the steps of the increase at the right wheel—compare broken-line and full-line curves of FIG. 1.

Figure 2:
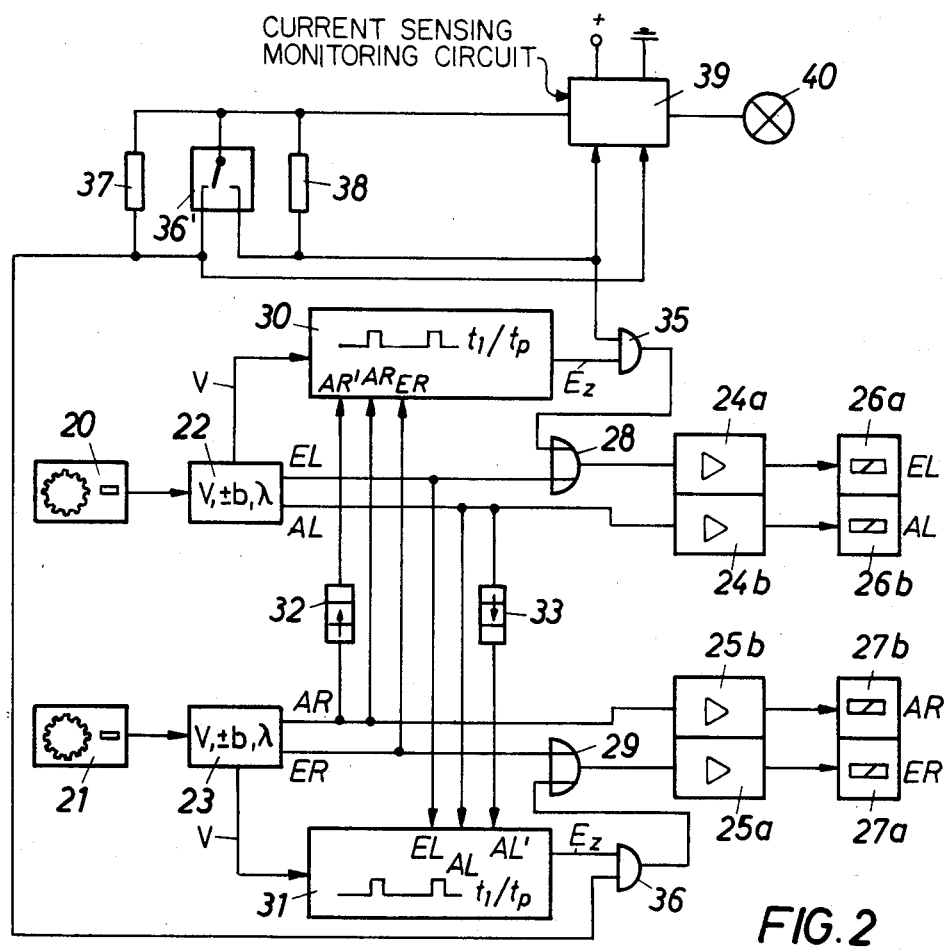
FIG. 2 is a block circuit diagram of an embodiment of the system in accordance with the present invention.

FIG. 2 illustrates, generally, an anti-brake lock control system as described, for example, also generally in the referenced patent. In accordance with the present invention, additional apparatus is provided to override the yaw control portion thereof if operation in a curve is recognized.

As shown in FIG. 2, two identical channels for control of the brakes at the left and right side of the vehicle are provided. The left channel has a speed transducer 20, for example coupled to a wheel at the left side of the vehicle, which controls a signal processing stage 22 which, in turn, controls amplifier circuits 24a, 24b for controlling operation,
that is, opening or closing of the left inlet valve 26a for braking pressure, or the left outlet valve 26b for braking pressure. Thus, if valve 26a is open, pressure will increase; if both valves 26a, 26b are closed, the braking pressure will be maintained; if valve 26b opens, pressurized brake fluid may drain and the braking pressure will drop.

The channel at the right side for the right wheels of the vehicle is identical, and has corresponding elements 21, 23, 25b, 25a, and 27b, 27a, corresponding to the elements in the left channel which are less by one unit value.

An OR-gate 28, 29, respectively, is connected in advance of the control circuits 24a, 25a; a further input to the OR-gates 28, 29 has the clamping or control signal $E_z$ applied thereto. The clamping signal $E_z$ is generated by a pulse generator 30, 31, respectively; the pulse generator 30, which is associated with the left side of the vehicle, has signals applied thereto which are derived from the control signals for the right side of the vehicle, namely the signals which are applied to the inlet and outlet valves 27a, 27b, and an additional signal which is the right-hand side drainage signal AR connected through a time delay circuit 32. The inlet signal ER is connected directly to the pulse generator circuit 30. The signals appearing in the pulse generator circuit are labeled, similarly, AR, ER, and AR', respectively, the signal AR' being a timing signal derived from the signal AR. The signal AR' occurs only if the signal AR continues for a period which is longer than a predetermined timing period $t_0$. This predetermined timing period is set into the time delay element or timing circuit 32.

Corresponding symmetrical connections extend from the left side of the vehicle, and apply the left side inlet signals EL and outlet or drainage signals AL, to the pulse generator 31. A timing signal, derived from timing circuit 33, likewise is provided, and forms the signal AL' if the signal AL persists for a longer period of time than the predetermined timing interval $t_0$.

In addition to the signals described, the respective pulse generator circuits 30, 31 receive signals v which are derived from the signal evaluation circuits 22, 23, respectively, and are representative of wheel speed or vehicle speed, respectively, as desired. The pulses v, being speed signals, are used in generating the pulse sequence by the pulse generators 30, 31, respectively. The pulse generators 30, 31 then provide at the output terminal a signal $E_z$ which occurs upon first occurrence of the signal ER or EL, respectively, in the channel of the other side of the vehicle, and which then changes to a pulse sequence with a duty cycle $t_1/t_p$. The pulses of the pulse generator 30, 31 are connected to the output $E_z$ only when the control system is operative, that is, if either a signal AR' or AL', as the case may be, is available and no signal ER, ER' longer than the timing period $t_0$ is present. The respective circuits 30, 31 include, as previously described, timing circuits similar to circuits 32, 33 to internally also define the timing period, or they may use the timing period from the timing circuits 32, 33. The pulses from the respective pulse generators 30, 31 additionally are not applied if there is an increase in braking pressure at the side of the vehicle having the lower frictional coefficient. Excessive drop of braking pressure on the side with the lower frictional coefficient is recognized in that either the signal of the drainage valve remains open for too long—the signal AR' or AL', respectively—or that an increase in braking pressure has not been sensed within the timing interval $t_0$.

If, in the circuit according to FIG. 2, the situation arises that the drainage valve at the right side of the vehicle, for example, opens for such a long time that the braking pressure at the right side of the vehicle drops excessively, the signal ER will be missing for an excessive period of time. This, then, will lead to the following sequence: First, the inlet valve was held closed, so that the pulses from pulse generator 30 will be passed through the AND-gate 35 and the OR-gate 28 to the inlet valve for pressurized brake fluid at the left side of the vehicle, with the predetermined or preset duty cycle $t_1/t_p$; with this duty cycle, the braking pressure will increase successively at the left side of the vehicle. The second input to the AND-gate 35, normally, is "high", thus passing the signals from pulse generator 30, as will be explained below. This operating condition is shown in FIGS. 3 and 4. As best seen in FIGS. 3 and 4, the pressure will first be held constant or even after the automatic anti-brake lock or anti-skid system ABS becomes effective, and the time is checked in which the braking pressure $P_R$ at the right side remains dropped, that is, no additional increase in braking pressure occurs. A maximum time period $t_0$ is provided, set, for example, by the timing circuits 32, 33, and/or inherently within the pulse generators 30, 31 by a suitable timing circuit therein. After expiration of the time period $t_0$, a commanded increase in brake pressure $P_L$ at the left side of the vehicle will occur. To this end, the clamping control pulse $E_z$ with the duty cycle $t_p/t_1$ is provided. $t_p$ is the pause in pulses, and $t_1$ is the pulse duration of increase of braking pressure in steps $\Delta P$ at the left side of the vehicle. In the customary and usual anti-brake block systems, braking pressure is increased by holding the outlet valve closed and opening the inlet valve for a predetermined time period; in this type of braking system, then, the increase in braking pressure, that is, the pressure step $\Delta P$ is directly proportional to the time period $t_p$.

The pulsed forced or clamped increase of the pressure $P_L$ at the left side of the vehicle will be continued until, at the right side of the vehicle, a regular pressure increase occurs—see point 17, FIG. 3. From this time on, the pressure $P_L$ at the left side of the vehicle will be controlled in accordance with the pressure increase at the right side of the vehicle, as seen in the curve portion 18, 53. This is known in the State of the Art.

Overall, thus, a substantial decrease in the braking distance will occur without any marked increase in yawing torques being applied.

In accordance with a preferred embodiment of the invention, the time period $t_1$, and/or the time period $t_p$, can be matched to various types of operating conditions by making the time period, or one of them, dependent on wheel speed or vehicle speed. This is shown in FIG. 4 by the different time periods $t_1$, $t_1^*$. It is possible to set $t_p$ inversely proportional to speed, and $t_1$ directly proportional to speed—this arrangement being a preferred embodiment.

In accordance with the present invention, two additional control elements to control the inlet pressure through the valves 26a, 27a, that is, to control the inlet signals EL and ER, respectively, are provided. These control elements, in their simplest form, are AND-gates 35, 36, which can block the outputs from the pulse generators 31, 32, respectively. Blockage is commanded by a transverse acceleration sensor or transversely mounted accelerometer 36'. In dependence on the direction of transverse acceleration, it provides a signal to one or the other output and then to AND-gate 35 or 36, respectively, if a predetermined transverse, that is, centrifugal acceleration threshold is exceeded. A suitable threshold is, for example, 0.3 g. This acceleration threshold sensor 36', then, provides an output signal which, if the vehicle passes through a curve, recognizes that the vehicle has experienced consequent centrifugal acceleration and thus the output signal $E_z$ which normally controls should be interrupted or inhibited from controlling the respective inlet valve 26a, 27a. The conditions of inlet pressure—maintenance of a constant pressure or pulsed slow admission of pressurized fluid of the wheel which has the higher braking effort—is inhibited, full braking pressure can be applied, resulting in rapid increase in pressure level.

The switching terminals of the accelerometer 36' are connected in parallel to resistors 37, 38 which have a current supplied thereto from a curent sensing monitoring circuit 39. Closing of either of the acccelerometer contacts short-circuits the respective resistor 37, 38, thus causing a signal normally holding AND-gates 35, 36 in OPEN condition to fail and inhibiting transmission of signals $E_z$. If an electrical terminal of the accelerometer should fail, or a line break, the current will change through the current sensing monitoring circuit 39 which causes a warning lamp 40 to light, providing an indication to an operator of malfunction.

FIG. 5 illustrates pressure relationships at the two brakes of the two wheels, for example the front wheels at the two sides of a vehicle, when, due to operation of the centrifugal accelerometer switch 36', the yaw limitation circuit formed by the pulse generators 30, 31, connected as shown and controlled by the signals ER, AR, AR' and V—and similarly EL, AL, AL', V—is inhibited due to blocking of the respective AND-gates 35, 36.

In accordance with a further feature of the invention, the control elements 35, 36 are not mere AND-gates but, rather, merely limit the effects or level of the signals $E_z$ to provide for controlled mixing of the respective signals $E_z$ and EL, ER, respectively. AND-gates 35, 36 are the simplest and most reliable, and hence preferred structure.

Various changes and modifications may be made, and any features described herein may be used with any of the others, within the scope of the inventive concept.

I claim:

1. Vehicular automatic anti-brake lock system (ABS) having
   wheel speed sensors (20) providing wheel speed signals;
   a left axle brake control system (22) receiving the wheel speed signals from at least one left wheel of the vehicle;
   a right axle brake control system (23) receiving the wheel speed signals from at least one right wheel of the vehicle;
   the brake control systems controlling admission and drainage, respectively, of pressurized brake fluid to a brake of a vehicle wheel on a respective side of the vehicle, in dependence on at least one of: vehicle speed, acceleration (+b), deceleration (−b), wheel slip;
   and means to limit yaw upon unsymmetrical frictional relationship between the at least one wheel on the left side of the vehicle and the at least one wheel on the right side of the vehicle,
   said means comprising a pair of brake control units (30, 31), one each for the brake of the at least one wheel on the left side of the vehicle and the brake of the at least one wheel on the right side of the vehicle, and being responsive, respectively, to signals controlling admission and drainage of pressurized brake fluid of the right side and left side, respectively, to thereby control the braking effort on one side of the vehicle (e.g. left side) as a function of the braking effort on the other (then: right side of the vehicle),
   and comprising, in accordance with the invention,
   an accelerometer (36') sensing centrifugal acceleration of the vehicle due to the vehicle passing through a curve;
   and control means (36, 35) coupled to the brake control units (30, 31) of the left and right sides of the vehicle, respectively, and inhibiting command of increased brake pressure as a function of centrifugal vehicle acceleration, as sensed by said accelerometer (36'),
   said control means (36, 35) being connected to and controlled by said accelerator (36').

2. System according to claim 1, wherein said control means (36, 35) inhibits command of increase of brake pressure being applied to the front wheels of the vehicle only.

3. System according to claim 1, including a monitoring circuit (37, 38, 39, 40) connected to the accelerometer (36') and monitoring operation thereof.

4. System according to claim 1, wherein said control means (36, 35) comprises circuit elements (36, 35) coupled to the means to limit yaw modifying transmission of output signals from said yaw limiting means to the respective brake control systems.

5. System according to claim 1, wherein said control means (36, 35) comprises AND-gates (36, 35) coupled to the means to limit yaw, and interrupting transmission of output signals from said yaw limiting means to the respective brake control systems.

6. System according to claim 4, wherein said circuit elements are connected to modify transmission of the output signals to the brake control systems of the front wheels only.

7. System according to claim 5, wherein said AND-gates are connected to interrupt transmission of the output signals from said yaw limiting means to the front wheels only.

* * * * *